(12) United States Patent
Simmons

(10) Patent No.: US 7,621,712 B2
(45) Date of Patent: Nov. 24, 2009

(54) APPARATUS AND METHOD FOR STACKING LAYERS OF ITEMS BY SEPARATE ROTARY SUPPORTING CONVEYOR

(75) Inventor: Zane Lee Simmons, Troy, NC (US)

(73) Assignee: D. R. Reynolds Company, Inc., Star, NC (US)

(*) Notice: Subject to any disclaimer, the term of this patent is extended or adjusted under 35 U.S.C. 154(b) by 243 days.

(21) Appl. No.: 11/694,275

(22) Filed: Mar. 30, 2007

(65) Prior Publication Data

US 2007/0243056 A1    Oct. 18, 2007

Related U.S. Application Data

(60) Provisional application No. 60/792,349, filed on Apr. 17, 2006.

(51) Int. Cl.
*B65H 29/26* (2006.01)
*B65H 29/00* (2006.01)
*B65G 47/10* (2006.01)
*B65G 37/00* (2006.01)

(52) U.S. Cl. ............ 414/793.9; 198/370.1; 198/475.1; 414/791.4

(58) Field of Classification Search .............. 198/374, 198/377.01, 377.02, 377.03, 377.07, 377.1, 198/378; 414/789.5, 791, 791.3, 794.4, 791.6, 414/791.9, 792.8, 793.9, 794, 794.2, 794.7, 414/795

See application file for complete search history.

(56) References Cited

U.S. PATENT DOCUMENTS

| | | | | | |
|---|---|---|---|---|---|
| 3,081,888 | A | * | 3/1963 | Lawson | 414/789.5 |
| 3,295,703 | A | * | 1/1967 | Schiepe | 414/791.6 |
| 3,402,830 | A | * | 9/1968 | Copping et al. | 414/794.1 |
| 3,531,001 | A | * | 9/1970 | Lunden | 414/790.9 |
| 3,850,319 | A | * | 11/1974 | Di Frank et al. | 414/802 |
| 4,214,848 | A | * | 7/1980 | Verwey et al. | 414/793.5 |
| 5,073,081 | A | * | 12/1991 | Johnson | 414/802 |
| 6,467,606 | B1 | * | 10/2002 | Elent et al. | 198/370.1 |
| 6,722,844 | B2 | * | 4/2004 | Lunden | 414/789.5 |
| 6,960,058 | B2 | * | 11/2005 | Schwetz et al. | 414/793.9 |

* cited by examiner

*Primary Examiner*—Gregory W Adams
(74) *Attorney, Agent, or Firm*—Oblon, Spivak, McClelland, Maier & Neustadt, L.L.P.

(57) ABSTRACT

A stacking apparatus includes a feed device that feeds a succession of elongated items to a pick-up station, and a rotating structure having first and second arms at different angles about a rotation axis of the rotating structure. The arms have receiving surfaces mounted thereto that receive the elongated items as a layer at the pick-up station during rotation of the rotating structure as the receiving surface travels past the pick-up station. The apparatus also includes a carriage having layer supporting forks that receive the layer from the receiving surface during rotation of the rotating structure as the receiving surface travels past a layer receiving station. The carriage carries the layer from the layer receiving station and deposits the layer at a layer stacking station from the forks to form the stack of superimposed layers.

21 Claims, 2 Drawing Sheets

APPARATUS AND METHOD FOR STACKING LAYERS OF ITEMS BY SEPARATE ROTARY SUPPORTING CONVEYOR

CROSS-REFERENCE TO RELATED APPLICATION

The present application is related to U.S. Provisional Application Ser. No. 60/792,349, filed on Apr. 17, 2006, which is hereby incorporated by reference in its entirety.

BACKGROUND OF THE INVENTION

1. Field of the Invention

The present invention relates to an apparatus and method for stacking layers of items. More specifically, an apparatus and method for stacking superimposed layers of items, such as elongated items, either with or without the use of separation material between one or more of the superimposed layers.

2. Discussion of the Background

In the lumber industry, logs are initially cut into boards having various predetermined dimensions. Freshly cut boards are then generally sorted by width and length. Typically, the sorted boards are then arranged in stacks for storage, shipping, or further processing.

Dry boards are less likely to warp or subsequently change shape, thereby increasing their value. Therefore, freshly cut boards may be stacked for drying in a dry atmosphere, such as a dry kiln. In order to dry the boards in an efficient manner (quickly and in a substantially uniform manner along the length thereof), the boards may be stacked in layers with open spaces provided between each layer to enable drying gases to circulate through the stack. Therefore, during the stacking process, elongated wooden slats called "stickers" may be placed transversely between the layers of boards at spaced intervals along the length of the stack in order to separate the layers. Usually, the stickers have lengths equal to the width of the stack and are positioned transverse to the boards in the stack. The stickers are placed at desired intervals along the length of the stack to separate the layers of the boards to enable drying gases to circulate through the stack to uniformly and more quickly dry the boards.

Once the lumber boards are dry, the boards are typically taken to be dressed or planed to exact dimensions, and then the boards are trimmed to length. These finished boards are then typically stacked in a manner that is referred to as "dead packed," which means there are not stickers provided between each layer. In such dead packed stacks, typically a wooden strip called a "lath" is provided between a predetermined number of layers to prevent an out of square effect of the stack. For example, ten layers are placed directly on top of each other without anything between the layers, and then a lath is placed transversely across the boards at the top of the stack at predetermined intervals along the length of the stack, and then ten more layers are placed directly on top of each other without anything between the layers, which results in a complete "dead packed" package.

Related art stacking devices typically use a device to receive a first layer of boards, transfer the first layer in a horizontal direction, and discharge the first layer at a stacking position. The device will then move horizontally to return to the starting position in order to lift a second layer of boards to transfer and discharge the second layer in the same manner as the first layer. The inventor of the present invention has determined that such a device is inefficient in that it only has the ability to transfer and stack one layer at a time. Additionally, such a configuration is inflexible in that device does not allow for any variation in height between the position at which the layer is received and discharged. Furthermore, such a device does not incorporate a device for inserting stickers or a lath between layers.

SUMMARY OF THE INVENTION

The present invention advantageously provides a stacking apparatus and method for forming a stack of superimposed layers of elongated items that overcomes the drawbacks of related art devices and provides additional advantages over related art devices.

The present invention advantageously provides a stacking apparatus that includes a feed device configured to feed a succession of elongated items and receive a number of the elongated items at a pick-up station, and a rotating structure having at least a first arm and a second arm provided at different angles about a rotation axis of the rotating structure, where each of the first arm and the second arm have a receiving surface mounted thereto. The receiving surface is configured to receive the number of elongated items as a layer at the pick-up station during rotation of the rotating structure as the receiving surface travels past the pick-up station. A carriage is provided having a plurality of layer supporting forks. The carriage is movable to a layer receiving station, and the forks are configured to receive the layer from the receiving surface during rotation of the rotating structure as the receiving surface travels past the layer receiving station. Additionally, a layer stacking station is provided to receive the layer from the forks to form the stack of superimposed layers, where the carriage is configured to carry the layer from the layer receiving station and deposit the layer at the layer stacking station.

It should be noted that the rotating structure can be provided with additional arms at different angles about the rotation axis of the rotating structure. Also, plural rotating structures can be provided that rotate in unison in a coaxial manner, for example, by mounting the plural rotating structures on a common axle. The receiving surfaces are preferably configured to maintain a horizontal orientation throughout a rotation of the rotating structure, for example, by using timing belts that extend around an axis of rotation of the receiving surface and an axis of rotation of a respective arm.

The present invention provides an advantageous apparatus in which the pick-up station and the layer receiving station can be provided at different elevations.

Additionally, the carriage of the present invention can also be provided with a separation material pick-up system configured to pick-up separation material at a separation material pick-up station and deposit the separation material at the layer stacking station.

The present invention also advantageously provides a stacking apparatus for forming a stack of superimposed layers of elongated items, where the stacking apparatus includes means for feeding a succession of elongated items to a pick-up station to form a layer of elongated items, means for transporting the layer from the pick-up station to a layer receiving station during a portion of movement of the means for transporting about a closed loop, and means for receiving the layer at the layer receiving station from the means for transporting and depositing the layer at a layer stacking station to form the stack of superimposed layers.

The present invention further advantageously provides a method of forming a stack of superimposed layers of elongated items, where the method includes feeding a succession of elongated items to a pick-up station to form a layer of elongated items, transporting the layer from the pick-up station to a layer receiving station during a portion of travel about a closed loop, receiving the layer at the layer receiving station, and depositing the layer at a layer stacking station on a preceding layer of elongated items to form the stack of superimposed layers.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Figure 1:
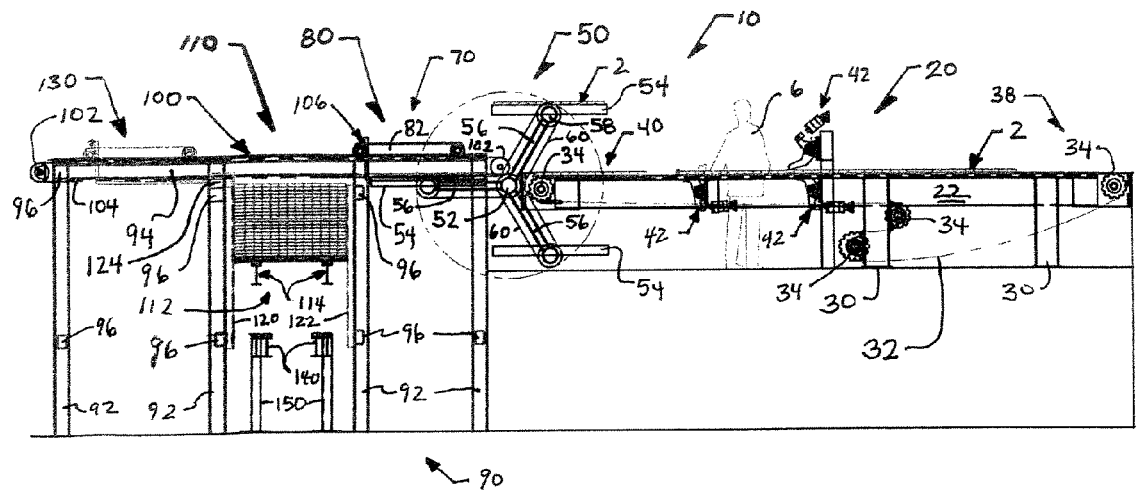
FIG. 1 is a front schematic view of an embodiment of a stacking apparatus according to the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

The present invention relates to an apparatus and method for stacking layers of items. More specifically, an apparatus and method for stacking superimposed layers of elongated items, such as lumber or other elongated stackable items. While the embodiment of the present invention described herein is described as stacking boards of lumber, the present invention is not limited to use with lumber, but rather can be adapted to anything stackable using the principles disclosed in detail herein.

The stacking apparatus of the present invention can also include a system for placing separation material in between one or more of the superimposed layers depending on the desired resulting stack. For example, a system can be included that can place a wooden strip (or "lath") or other separation material after a predetermined number of layers are stacked in order to "dead pack" the stack for purposes of shipping or storage, for example. Alternatively, a system can be included that can place plural elongated wooden slats (or "stickers"), sticks, dunnage, and/or other elongated separation materials, in between each layer in the stack in order to produce a stack in which the stacked items, such as freshly cut wood, can dry more efficiently by allowing air to circulate in between the layers.

FIGS. 1-4 depict schematic views of an embodiment of a stacking apparatus (10) of the present invention. The stacking apparatus can be used for forming a stack of superimposed layers of elongated items. The stacking apparatus includes a feed device 20, a rotating structure 50, a carriage 80 having a plurality of layer supporting forks 90, and a layer stacking station 110.

Figure 2:
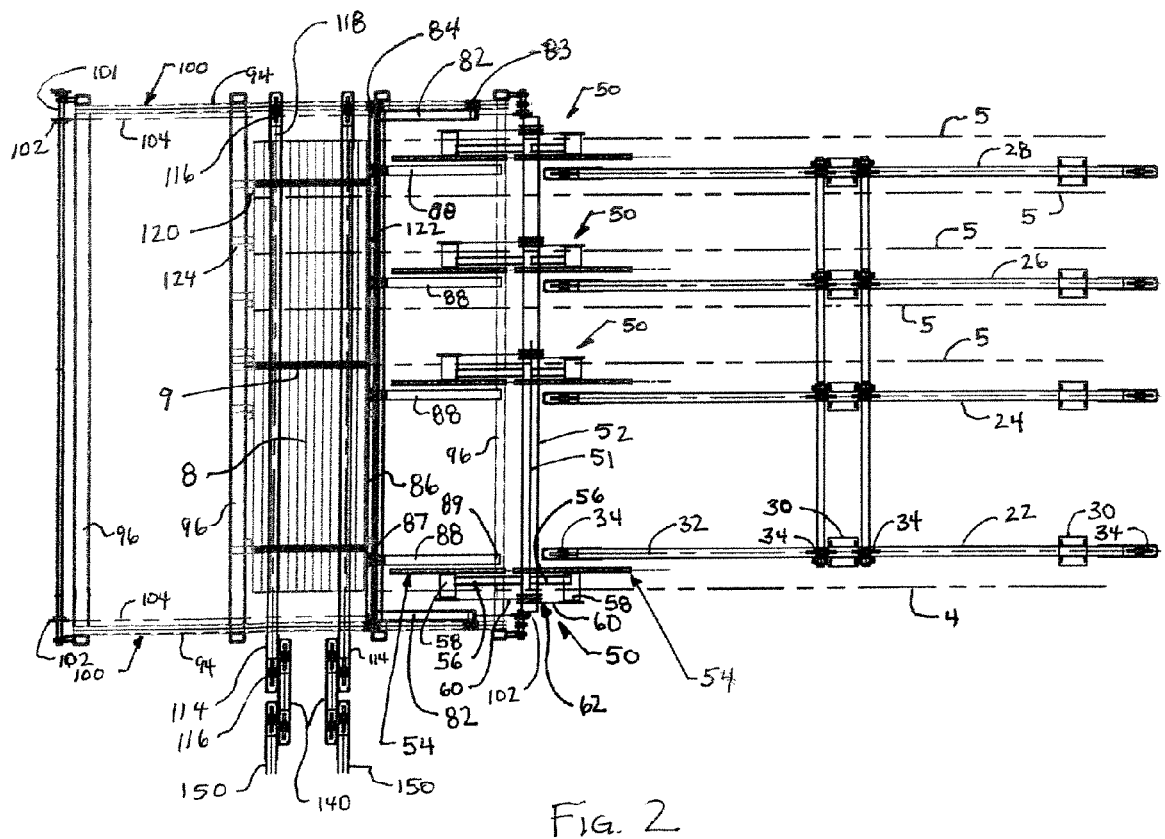
FIG. 2 is a top schematic view of the embodiment of the stacking apparatus depicted in FIG. 1.
Figure 3:
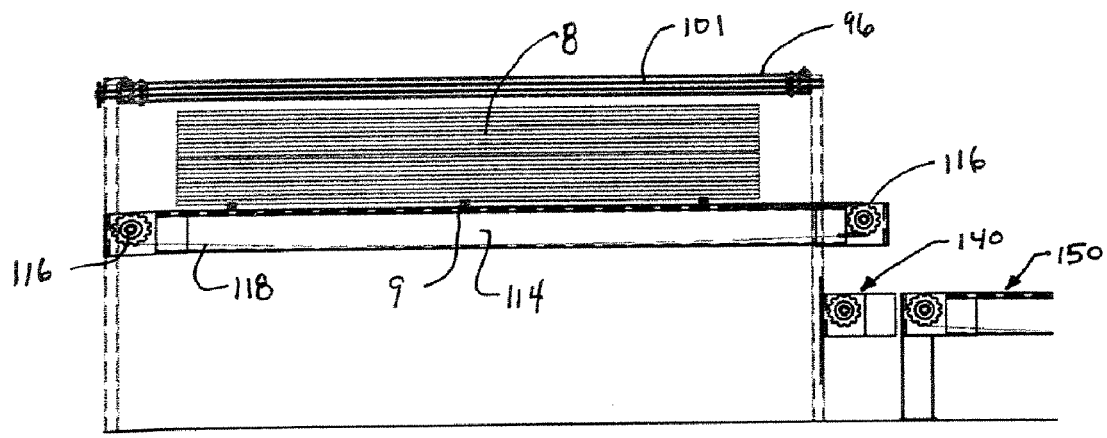
FIG. 3 is a left side schematic view of the embodiment of the stacking apparatus depicted in FIG. 1.

FIGS. 1 and 2 depict the feed device 20, which is configured to feed a succession of elongated items, such as boards of lumber 2. The feed device 20 includes four feed rails 22, 24, 26, and 28, where in the preferred embodiment the feed rail 22 is typically used to support a portion of a first end (shown as dashed line 4) of the boards 2. Also, depending on the length of the boards, one of more of feed rails 24, 26, and 28 are then used to support a second end (shown as dashed lines 5 representing various lengths of boards) of the boards 2.

Each of the feed rails 22, 24, 26, and 28 are supported by support members 30 (for simplicity only rail 22 is labeled). Each of the feed rails 22, 24, 26, and 28 include a closed loop belt 32 that is guided by various rollers 34 and driven by a motor (not depicted) at one of the rollers 34 or by an additional drive roller. For example, the belts 32 of each individual feed rail can be driven by a motor that drives the rightmost rollers in FIGS. 1 and 2, or all of the belts 32 of the feed rails can be driven by a motor that drives one of the center rollers, which each include a common axle that extends to each feed rail, thus allowing a single motor to drive all of the belts 32 in unison.

At the uppermost portion of the path of the belts 32, the belts 32 travel along an upper surface of the feed rails 22, 24, 26, and 28, during which time the belts 32 are used to feed boards 2 from a presentation area 38, where the boards 2 are loaded onto the feed device 20, to a pick-up station 40. The feeding process can be automatically controlled or controlled by an operator 6, by controlling the speed at which the belts 32 are driven by the motor(s) and by using various devices 42 to align the boards 2 and to separate out a predetermined number of boards 2 that will be fed to the pick-up station 40 to later form a layer of the stack.

While the feed device 20 depicted in the figures is configured to feed elongated boards, it should be noted that the configuration of the feed device can be varied in order to allow for the feeding of other types, shapes, and sizes of items that are desired to be stacked, while remaining within the scope of the present invention. For example, the spacing and number of feed rails provided in the feed device 20 can selected based upon the items being stacked, and the type of belts and rollers used can be varied depending upon the item being handled and transported thereby (e.g., to prevent scratching or damage of item, to ensure the proper frictional characteristics between the item and the belt, to ensure that the belt can carry the weight of the item, etc).

Figure 4:
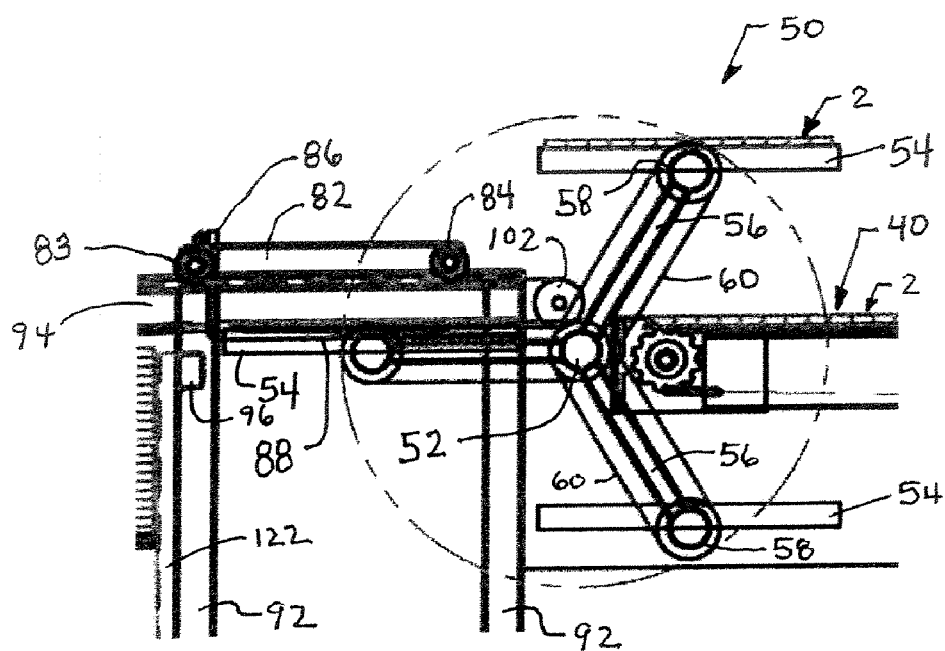
FIG. 4 is an enlarged, partial, front schematic view of a rotating structure and carriage of the embodiment of the stacking apparatus depicted in FIG. 1.

Once a predetermined number of boards 2 are fed to the pick-up station 40 of the feed device 20, then the rotating structure 50 is used to transport the layer of boards to the next station in the apparatus 10. The apparatus 10 depicted in the figures has four rotating structures 50, which each have three arms 56 that are evenly distributed one-hundred and twenty degrees apart from each other about a common rotational axis 51 (at sixty degrees, one-hundred eighty degrees, and three-hundred degrees as seen in FIGS. 1 and 4). It should be noted that the rotating structures 50 can alternatively each have as few as two arms or as many arms as desired that are preferably, but not necessarily, evenly distributed about the axis of rotation 51. The four rotating structures 50 are each mounted to a common axle 52, and thus can be driven to rotate in unison in a coaxial manner by a motor (not depicted) along a circular, closed loop path. In the depicted embodiment, the axis of rotation 51 about which the rotating structures 50 rotate is perpendicular to the feeding direction of the feed device 20. The rotation of the rotating structures 50 can be continuous at a constant speed, or can be at varied speeds or started/stopped depending upon the desired output and the actual input of boards. Additionally, note that configuration of the three-armed rotating structures and the locations of the pick-up station 40 and a layer receiving station 70 (described below) allow the rotating structures 50 to carry multiple layers of boards simultaneously (i.e., drop off a first layer at the layer receiving station 70 while a second layer is being picked up at the pick-up station 40). The rotating structures 50 and axle 52 can be mounted to a base, or to another section of the apparatus.

The rotating structures 50 depicted in FIGS. 1, 2, and 4 have three arms 56 rigidly mounted on axle 52. Each arm 56 has a receiving surface 54 that is pivotally mounted to the end of each arm 56 via pivot joint 58. In this embodiment, the receiving surfaces 54 are narrow elongated bars that are mounted to joint 58 at a center of the bar and are oriented to extend in a direction parallel to the feed direction of the feed device 20.

The receiving surfaces 54 are configured to maintain a horizontal orientation throughout a rotation of their respective rotating structure 50. In order to achieve this self-leveling feature, each receiving surface 54/arm 56 has a timing belt 60 that extends in a closed loop around a sprocket on pivot point 58 that rotates in unison with the respective receiving surface 54 and around a fixed sprocket 62 (one of three fixed sprockets for each rotating structure) that is provided coaxially with the axle 52 but that does not rotate therewith. As the rotating structure 50 rotates about axis 51, the timing belts 60 will maintain the horizontal orientation of the receiving surfaces 54. As will be evident to one of ordinary skill in the art based on the above discussion, alternative timing belt configurations can be used to achieve these goals by using different fixed and pivoting configurations for the axle 52, the various sprockets, arms 56, and receiving surfaces 54.

The receiving surfaces 54 are configured to receive the predetermined number of boards 2 as a layer at the pick-up station 40 during rotation of the rotating structures 50 as the receiving surfaces 54 travel past the pick-up station 40. Note that the rotating structures 50 and receiving surfaces 54 are spaced and shaped so as not to interfere with the feed rails 22, 24, 26, and 28 of the feed device 20 as they travel through the pick-up station 40. Note also that the axis of rotation 51 of the rotating structures 50 is provided at about the same elevation as the pick-up station 40 of the feed device 20; however, alternatively any portion of the rotating path of the receiving surfaces 54 at which the receiving surfaces 54 are traveling in an upward manner can be oriented to pass through the pick-up station 40 and thus the axis of rotation 51 can be oriented either above or below the pick-up station 40 depending upon the desire configuration of the apparatus and overall processing plant.

Thus, the receiving surfaces 54 receive the layer of boards 2 at the pick-up station 40 and transport the layer along a counterclockwise path (in the orientation depicted in FIGS. 1 and 4) to a layer receiving station 70. A carriage 80 is movable (or propelled) to and positioned at the layer receiving station 70 as the receiving surfaces 54 travel through the layer receiving station 70. The carriage 80 has a plurality of layer supporting forks 88 that are configured to receive the layer of boards from the receiving surfaces 54 during rotation of the rotating structures 50 as the receiving surfaces 54 travel past the layer receiving station 70.

The left side of the apparatus 10, as depicted in FIGS. 1 and 2, includes a frame structure 90 that has at least four vertical frame members 92 on each of a front side and a rear side of the apparatus 10. The frame structure 90 also includes front and rear rails 94 that are connected to the top of each on the vertical frame members 92 on its respective side. The frame structure 90 further includes several horizontal crossbeams 96 that provide rigidity to the frame structure and are oriented so as not to interfere with the other components of the apparatus 10.

The carriage 80 includes two side members 82 that each have first and second rotating wheels 83 and 84. The carriage further includes a crossbeam 86 that extends between and rigidly interconnects the side members 82. In the embodiment depicted, four supporting forks 88 are mounted to the crossbeam 86. Each fork 88 has a first end 87 that extends downwardly from the crossbeam 86 and bends at a right angle to form an L-shaped configuration with a terminal end 89. The left side of the crossbeam 86 also has a separation material pick-up system that includes plural separation material pick-up devices 106 that are configured to clamp an end of a piece of separation material.

The wheels 83 and 84 of the carriage 80 engage with and are movable along tracks 100 that are provided on top surfaces of the front and rear rails 94. A driving device for the carriage 80 includes a rotatable drive axle 101 that is driven in forward and reverse rotation by a motor (not depicted). The drive axle 101 has pulleys 102 fixedly mounted thereon and pulleys 102 are rotatably provided on the opposite ends of the front and rear rails 94 near the layer receiving station 70. Each of the front and rear rails 94 has a cable or belt 104 that extends between the respective pulleys thereon, and each cable or belt 104 is connected to a respective side member 82 of the carriage 80. Accordingly, by driving the rotation of drive axle 101 in forward and reverse directions, the carriage 80 can be moved along the tracks 100, for example, from the layer receiving station 70 (where the carriage is shown in black lines in FIGS. 1, 2, and 4), to a layer stacking station 110, to a separation material pick-up station 130 (where the carriage is shown in gray lines in FIG. 1). Alternatively, the carriage 80 can be self-propelled, or another driving device can be provided.

Accordingly, the carriage 80 is moved to the layer receiving station 70 in order to receive on the forks 88 the layer of boards 2 from the rotating structures 50 as the receiving surfaces 54 travel past the layer receiving station 70. Note that the rotating structures 50 and forks 88 are spaced and shaped so as not to interfere with each other as the receiving surfaces 54 travel through the layer receiving station 70. Note that the rotating structures 50 are configured to rotate about an axis 51 that is perpendicular to a direction of motion of the carriage 80 from the layer receiving station 70 and to the layer stacking station 110. Note also that the axis of rotation 51 of the rotating structures 50 is provided at about the same elevation as the layer receiving station 70; however, alternatively any portion of the rotating path of the receiving surfaces 54 at which the receiving surfaces 54 are traveling in a downward manner can be oriented to pass through the layer receiving station 70 and thus the axis of rotation 51 can be oriented either above or below the layer receiving station 70 depending upon the desire configuration of the apparatus and overall processing plant. Additionally, the use of the rotating structures 50 also allow the pick-up station 40 and the layer receiving station 70 to be provided at different elevations if so desired.

When the layer of boards is received on the forks 88 at the layer receiving station 70, the carriage 80 then begins to travel in a leftward (as depicted in FIGS. 1 and 2) path towards the layer stacking station 110.

The layer stacking station 110 includes a plurality of left side aligning bars 120 vertically connected to the crossbeams 96 and a plurality of right side aligning bars 122 that are vertically connected to the crossbeams 96. The aligning bars 120 and 122 help to maintain the proper alignment of the layer of boards that are stacked in the layer stacking station 110. The top ends of the left side aligning bars 120 extend upward further than the top ends of the right side aligning bars 122. The top ends of the left side aligning bars 120 extend further upward in order to strip the layer of boards from the forks 88 of the carriage 80 as the carriage 80 travels leftward (as depicted in FIGS. 1 and 2) through the layer stacking station 110, thus depositing the layer of boards in the layer stacking station 110, while the lower top ends of the right side aligning bars 122 allow the layer to pass under without interference.

Thus, the layer of boards are deposited in the layer stacking station 110 onto a hoist mechanism 112 that includes two hoist arms 114 the elevation of which can be varied to receive the successive layers at an appropriate orientation. FIGS. 1 and 2 depict a stack of boards 8 that are provided with several separation materials 9 for spacing and support. The stack 8 can be formed on a base material for ease of packaging and movement of with various separation materials.

The hoist arms 114 each include a closed loop belt 118 that is guided by rollers 116 and driven by a motor (not depicted). At the uppermost portion of the path of the belts 118, the belts 118 travel along an upper surface of the hoist arms 114 in order to move the stack 8. Accordingly, once the stack is completed, the hoist mechanism can align the bottom of the stack 8 with an intermediate feed device 140 and an additional feed device 150, and then the belts 118 can be used to feed the completed stack 8 out of the layer stacking station 110 and onto the intermediate feed device 140 and the additional feed device 150. The discharge feeding of the completed stack 8 can be automatically controlled or controlled by an operator.

As noted above, the present invention also includes a layered separation material pick-up system. Thus, once the carriage 80 has completed the depositing of the layer of boards in the layer stacking station 110, then the carriage 80 is located at the separation material pick-up station 130, as is depicted in gray lines in FIG. 1. At this position, one or more of the plural separation material pick-up devices 106 spaced across the crossbeam 86 of the carriage can be used to clamp an end of a piece of separation material 9 from at a plurality of supply stacks (not depicted) at various locations at the separation material pick-up station 130. Once the pick-up device(s) (106) grasp the end(s) of the piece(s) of separation material, the carriage 80 is moved in a rightward (as depicted in FIGS. 1 and 2) direction through the layer stacking station 110 and to the layer receiving station 70. During this motion, the separation material is dragged behind the carriage 80 in a rightward direction guided by guide channels 124 and end up transversely oriented on top of the previously placed layer of boards. Once at the layer receiving station 70, not only is the carriage 80 in the proper location for receiving an additional layer on the supporting forks 88 from the rotating structures 50, but the carriage 80 is also in a proper position to release the grasp on the separation material thereby depositing the separation material at the layer stacking station.

The layered separation material pick-up system of the present invention can be used to form a dead packed stack or a spaced stack for drying, or to form any desired configuration of layers with or without interspersed separation material. For example, the layered separation material pick-up system can use the pick-up device(s) (106) to grasp the end(s) of one or more elongated wooden slats (or "stickers"), sticks, dunnage, and/or other elongated separation materials and deposit them in a transverse manner in between each layer of boards with the aid of channels 124 in order to form a stack that can allow drying of the boards. Alternatively, the layered separation material pick-up system can use the pick-up device(s) (106) to grasp the end of a wooden strip (or "lath") or other separation material for dead packing and deposit it on the stack after every tenth layer of boards without the need for the aid of channels.

The preferred embodiment of the present invention advantageously includes rotating structures with arms, where the rotating structures rotate in a single direction in a circular path for picking up layers and transferring them to a carriage having fork supports. The carriage is preferably gear driven for moving the carriage forward and rearward (right and left in FIGS. 1 and 2) at a predetermined speed, and a layer separation material pick-up system is preferably attached to the carriage thus travel thereof is also forward and rearward. The layer separation material pick-up is preferably at the most rearward position of the carriage, and the deposit of the layer separation material preferably occurs while the carriage is at the most forward position at a layer receiving station.

The present invention provides a stacking apparatus that can efficiently handle the movement of more than one layer at a time and in succession, and, in the process, also efficiently receive and deposition separation material as desired.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A stacking apparatus for forming a stack of superimposed layers of elongated items, said stacking apparatus comprising:
   a feed device configured to feed a succession of elongated items and receive a number of the elongated items at a pick-up station;
   a rotating structure having at least a first arm and a second arm provided at different angles about a rotation axis of said rotating structure, each of said first arm and said second arm having a receiving surface mounted thereto, said receiving surface being configured to receive the number of elongated items as a layer at said pick-up station during rotation of said rotating structure as said receiving surface travels past said pick-up station;
   a carriage having a plurality of layer supporting forks, said carriage being movable in a horizontal direction to a layer receiving station, said plurality of layer supporting forks being configured to receive the layer from said receiving surface during rotation of said rotating structure as said receiving surface travels past said layer receiving station; and
   a layer stacking station configured to receive the layer from said plurality of layer supporting forks to form the stack of superimposed layers, wherein said carriage having said plurality of layer supporting forks is configured to carry the layer from said layer receiving station and deposit the layer at said layer stacking station.

2. The stacking apparatus according to claim 1, wherein said rotating structure has a third arm having a receiving surface mounted thereto, said third arm being provided at a different angle about said rotation axis than said first arm and said second arm, said receiving surface of said third arm being configured to receive the number of elongated items as a layer at said pick-up station during rotation of said rotating structure as said receiving surface travels past said pick-up station.

3. The stacking apparatus according to claim 1, further comprising a plurality of said rotating structures configured to rotate in unison in a coaxial manner.

4. The stacking apparatus according to claim 1, wherein said rotating structure is configured to rotate about an axis that is perpendicular to a feeding direction of said feed device.

5. The stacking apparatus according to claim 1, wherein said rotating structure is configured to rotate about an axis that is perpendicular to a direction of motion of said carriage from said layer receiving station and to said layer stacking station.

6. The stacking apparatus according to claim 1, wherein said receiving surface is configured to maintain a horizontal orientation throughout a rotation of said rotating structure.

7. The stacking apparatus according to claim 6, wherein said rotating structure includes timing belts extending around an axis of rotation of said receiving surface and an axis of rotation of a respective arm, and wherein said timing belts maintain the horizontal orientation of said receiving surface.

8. The stacking apparatus according to claim 1, wherein said pick-up station and said layer receiving station are provided at different elevations.

9. The stacking apparatus according to claim 1, wherein said layer stacking station includes a hoist mechanism having hoist arms configured to receive and support the stack of superimposed layers.

10. The stacking apparatus according to claim 1, wherein said carriage further includes a separation material pick-up system configured to pick-up separation material at a separation material pick-up station and deposit the separation material at said layer stacking station.

11. The stacking apparatus according to claim 10, further comprising a guide channel configured to guide the separation material from said separation material pick-up station to said layer stacking station.

12. The stacking apparatus according to claim 10, wherein said separation material pick-up system is configured to pick-up separation material at a plurality of locations at said separation material pick-up station and deposit plural separation materials at said layer stacking station.

13. The stacking apparatus according to claim 10, wherein said feed device is configured to receive at said pick-up station a plurality of elongated items arranged in parallel, and wherein said separation material pick-up system is configured to deliver an elongated separation material to said layer stacking station such that an elongated direction of the separation material is substantially perpendicular to an elongated direction of the plurality of elongated items.

14. The stacking apparatus according to claim 10, wherein said separation material pick-up system is disposed the most rearward position of said carriage.

15. The stacking apparatus according to claim 1, wherein said layer stacking station includes a first and second set of aligning bars, said first set of aligning bars configured to strip the layer from said layer supporting forks when said carriage travels through said layer stacking station.

16. The stacking apparatus according to claim 15, wherein said first set of aligning bars extend upward further than said second set of aligning bars.

17. The stacking apparatus according to claim 15, wherein said second set of aligning bars is disposed closer to said receiving station than said first set of aligning bars in a direction parallel to the movement of the carriage.

18. A method of forming a stack of superimposed layers of elongated items, said method comprising:
    feeding a succession of elongated items to a pick-up station to form a layer of elongated items;
    transporting the layer from the pick-up station to a layer receiving station during a portion of travel about a closed loop;
    receiving the layer at the layer receiving station; and
    depositing the layer at a layer stacking station on a preceding layer of elongated items to form the stack of superimposed layers,
    wherein the layer is transported from the layer receiving station to the layer stacking station via a carriage having a plurality of layer supporting forks, said carriage being movable in a horizontal direction.

19. The method according to claim 18, wherein the layer is transported from the pick-up station to the layer receiving station by one of a plurality of arms that are provided at different angles about a rotation axis of a rotating structure, each of the plurality of arms having a receiving surface mounted thereto.

20. The method according to claim 18, wherein the pick-up station and the layer receiving station are provided at different elevations.

21. The method according to claim 18, further comprising receiving a separation material and depositing the separation material on top of the preceding layer before the layer is deposited on the preceding layer to form the stack of superimposed layers.

* * * * *